(No Model.)

I. P. BUCKLES.
MEAT OR VEGETABLE CUTTER.

No. 606,511.                     Patented June 28, 1898.

Witnesses
Victor J. Evans.
James P. Duhamel.

Inventor
Isaac P. Buckles.
By John Wedderburn
Attorney

UNITED STATES PATENT OFFICE.

ISAAC P. BUCKLES, OF FULFORD, COLORADO.

MEAT OR VEGETABLE CUTTER.

SPECIFICATION forming part of Letters Patent No. 606,511, dated June 28, 1898.

Application filed December 29, 1896. Serial No. 617,375. (No model.)

*To all whom it may concern:*

Be it known that I, ISAAC P. BUCKLES, a citizen of the United States, residing at Fulford, in the county of Eagle and State of Colorado, have invented certain new and useful Improvements in Meat or Vegetable Cutters; and I do hereby declare the following to be a full, clear, and exact description of the invention, such as will enable others skilled in the art to which it appertains to make and use the same.

My invention relates to meat and vegetable cutters.

My object is to provide a simple and cheap device of the class described which can be used in a variety of connections, being easily adjustable and readily manipulated.

Having this object in view, the invention consists of a meat and vegetable chopper comprising certain improved features and novel combinations of parts appearing more fully hereinafter.

Figure 1:
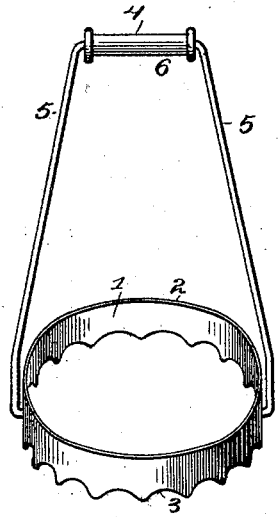
Figure 2:
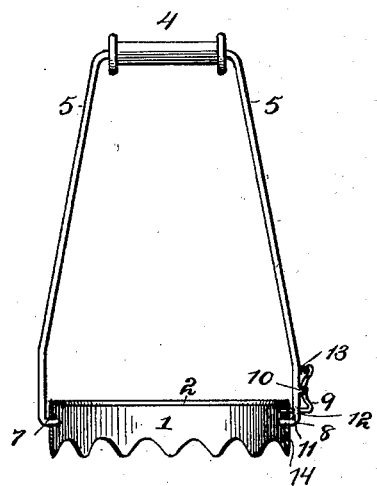
Figure 3:
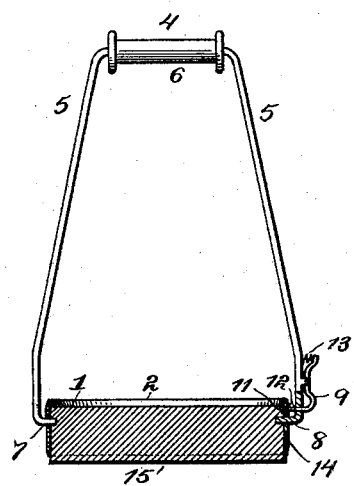

In the accompanying drawings, Figure 1 is a perspective of my device; Fig. 2, a sectional elevation; and Fig. 3 is a similar view as Fig. 2 and showing a mashing or pulping plug fitted in the knife.

The knife itself consists of an annular band of metal 1, which has one edge smooth and yet sharp, as shown at 2, and its other edge corrugated at 3. When the device is used, the smooth edge 2 is employed for cutting fruit and vegetables, as well as biscuit, cake, &c., and the corrugated edge employed in cutting meat and the like. The handle is shown at 4, and its side pieces are connected by an upper cross-piece 5, on which there is a handle 6. The lower ends of the side pieces are bent inwardly to provide stub axles or spindles 7 and 8, which are located in openings made at diametrically opposite points through the knife. I employ a locking-catch 9, which is pivoted to the handle at 10 and has a catch bolt or pin 11 working through the handle and adapted for reception in an opening 12 made in the knife.

The numeral 13 designates a coil-spring which is interposed between the free portion of the locking-catch and the handle, so that it tends to urge the catch pin or bolt into the opening 12 of the knife and keep the latter locked in relation to the handle. Whenever it is desired to reverse the knife, the free portion of the locking-catch is pressed toward the handle, whereupon the catch pin or bolt is withdrawn from the knife and the latter may be turned, whereupon the catch-pin will spring into another opening 14 in the knife and the latter be locked again. The smooth edge of the knife can be used as a cake or biscuit cutter and for slicing or dividing vegetables, fruits, and like food, while the corrugated edge is adapted for use in chopping meats. When the corrugated edge is used, it is preferable to impart to the knife a slight turning or twisting movement. At 15 there is shown a circular plug which is adapted to fit snugly in the knife, so that a flat surface can be presented when desirable to mash or pulp potatoes. This plug can be removed whenever desirable.

There are many slight changes which might be resorted to in carrying out the present invention without materially detracting from any advantages of the same, and hence I do not limit myself to the precise construction herein shown and described, but consider that I am entitled to all such variations as properly come within the spirit and scope of the invention.

Having thus described my invention, what I claim as new, and desire to secure by Letters Patent, is—

1. In a device of the class described, the combination with a handle having inwardly-extending stub spindles or axles, of an annular band having upper and lower cutting edges, and which is journaled on said stubs or spindles, and a spring-pressed catch adapted to lock the handle to the knife.

2. In a device of the class described, the combination with a handle, of an annular knife pivoted to said handle and adapted to be reversed, a locking-catch pivoted to the handle and provided with a free portion, and also having a locking pin or bolt adapted to engage with the knife, and a spring interposed between the handle and the free portion of said catch.

3. In a device of the class described, the combination with a handle provided with side pieces terminating in inwardly-extending stub spindles or axles, of an annular band of metal journaled to swing on said stub-spindles and having one edge formed into a smooth cutter and its other edge made into a corrugated cutter, a locking-catch pivoted to the handle and provided with a free portion and also having a locking pin or bolt adapted for reception in an opening of the knife, and a coil-spring interposed between the handle and the free portion of the locking-catch which acts to keep the locking pin or bolt normally locked in the opening of the knife whereby the knife and handle are locked together.

In testimony whereof I have signed this specification in the presence of two subscribing witnesses.

ISAAC P. BUCKLES.

Witnesses:
MARIE S. BUCKLES,
A. W. MAXFIELD.